March 24, 1959  G. CLARK ET AL  2,878,737
PHOTOGRAPHIC EXPOSURE CONTROLLING MEANS
Filed Dec. 23, 1955  2 Sheets-Sheet 1

Geoffrey Clark & Hugo Nagel INVENTORS
BY
ATTORNEYS

March 24, 1959 G. CLARK ET AL 2,878,737
PHOTOGRAPHIC EXPOSURE CONTROLLING MEANS
Filed Dec. 23, 1955 2 Sheets-Sheet 2

Geoffrey Clark & Hugo Nagel
INVENTORS
BY
ATTORNEYS

United States Patent Office 2,878,737
Patented Mar. 24, 1959

2,878,737
PHOTOGRAPHIC EXPOSURE CONTROLLING MEANS

Geoffrey Clark and Hugo Nagel, Harrow, England, assignors to Eastman Kodak Company, Rochester, N.Y., a corporation of New Jersey Application December 23, 1955, Serial No. 555,172

Claims priority, application Great Britain January 5, 1955

2 Claims. (Cl. 95—64)

The present invention relates to photographic exposure controlling means, more particularly for photographic cameras.

In accordance with the present invention photographic exposure controlling means comprises an adjustable diaphragm, a multiple-speed shutter and a lost-motion connection between a manually operable diaphragm adjusting means and shutter speed adjusting means for effecting a decrease in the shutter speed when the size of the diaphragm aperture is increased beyond a predetermined value.

According to one practical embodiment of the invention hereinafter described, the shutter speed adjusting means is spring urged to a position which provides the shortest exposure time of which the shutter is capable and is disposed in the path of movement of a pin carried by the diaphragm adjusting means. Preferably, the shutter speed is decreased when the size of the diaphragm aperture is increased beyond its maximum effectual size.

In order that the invention may readily be understood, one form thereof will now be described, by way of example, with reference to the drawings accompanying the specification in which.

Figure 1:
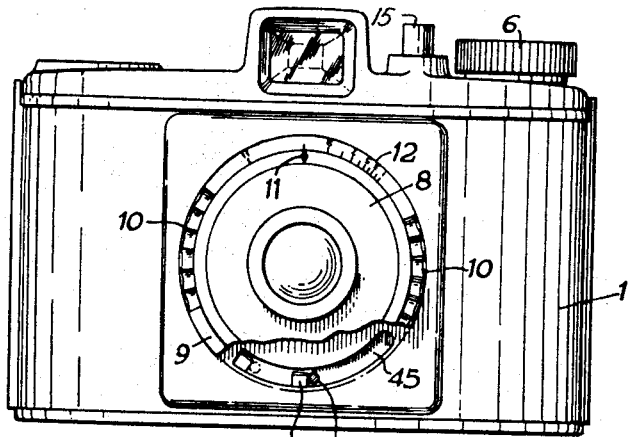
Fig. 1 is an elevation of a photographic camera incorporating exposure controlling means constructed in accordance with one form of the invention.
Figure 2:
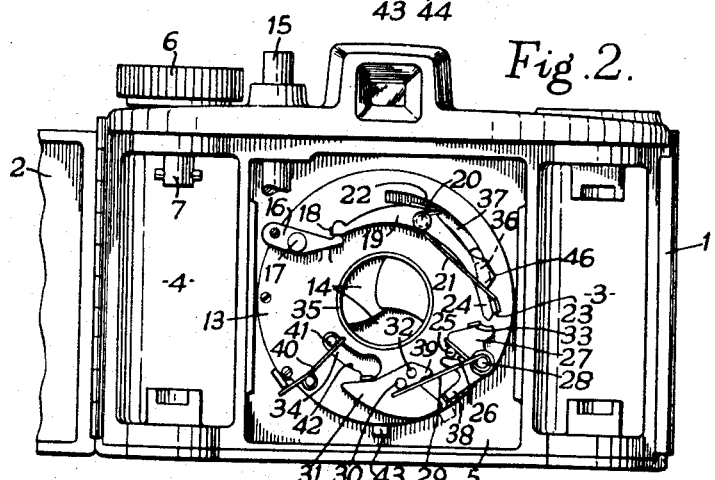
Fig. 2 is a rear elevation of the camera shutter in Fig. 1, with the back open to show details of the two-speed shutter.

As illustrated, a camera 1 is provided with a pivotally mounted back 2 which encloses a supply chamber 3, a take-up chamber 4 and an exposure chamber 5. A winding knob 6 is attached to a spindle 7 which terminates in a key for engagement with a slot in one end of a film spool (not shown), in known manner.

The camera is provided with an iris diaphragm of any known type which is disposed beneath a diaphragm plate 8 and is adjustable in known manner by means of a manually operable diaphragm ring 9 having knurled portion 10 to facilitate gripping the ring. An index 11 on the diaphragm plate 8 cooperates with a scale 12 on the diaphragm ring 9, this scale preferably being calibrated in the manner illustrated to indicate predetermined light values instead of conventional $f$ numbers.

The shutter may comprise any known type of multi-speed shutter having a member which is adjustable to vary the duration of the exposure. As illustrated, a two speed shutter comprises an annular mechanism plate 13 overlying shutter blades 14 which are opened and closed in known manner by operating a shutter blade ring (not shown). A shutter releasing plunger 15 extends to the exterior of the camera casing and has its lower end pivotally connected to one end of the lever 16 which is pivotally mounted at 17 on the mechanism plate 13 and engages a lug 18 on one end of a lever 19 pivotally mounted at 20 on the mechanism plate 13. A spring 21 encircles the pivot 20 and has one end bearing against a projection 22 on the lever 19 and the other end bearing against a projection 23 on the mechanism plate 13, so that the spring tends to turn the lever 19 in a counter-clockwise direction as viewed in Figs. 2–8, the turning movement of the lever 19 in a counter-clockwise direction being limited by the engagement of the end 24 of the lever 19 with the projection 23 on the mechanism plate 13. A pin 25 is secured to the oscillatable blade operating ring and projects through a slot in the mechanism plate 13 for engagement in an aperture 26 in a member 27 pivotally mounted at 28 on the mechanism plate 13. This member 27 is urged in a counter-clockwise direction (as viewed in Figs. 2–7) by means of a spring 29 which encircles the pivot 28 and has one end bearing against the pin 25 and the other end bearing against a pin 30 on a weighted member 31 pivotally mounted at 32 on the mechanism plate 13. The member 27 is formed with an upstanding lug 33 which is provided with a cam surface as shown more clearly in Fig. 8.

Figures 3, 4:
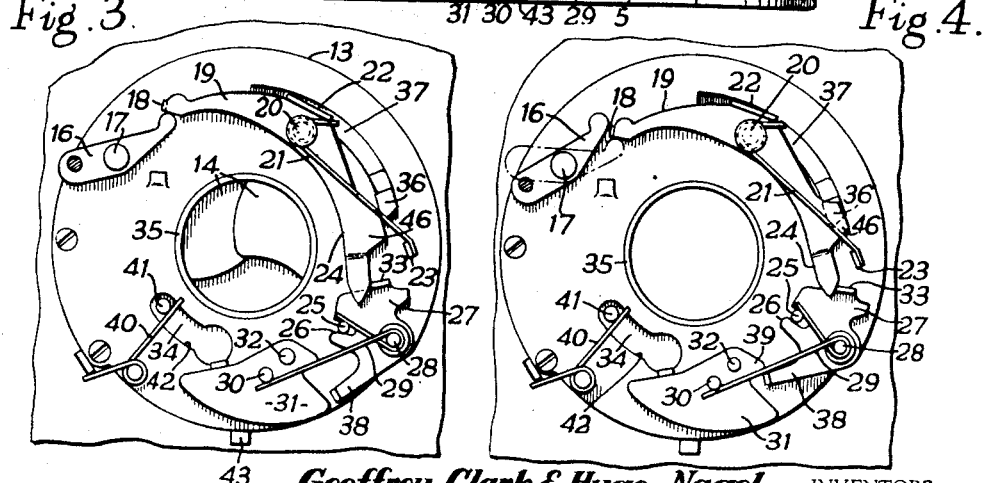
Fig. 3 is a rear elevation, to an enlarged scale, of the shutter shown in Fig. 1 with the parts thereof in the position they assume just prior to opening the shutter blades, but adjusted for the shortest exposure time.
Fig. 4 is a view similar to Fig. 3 showing the shutter parts in the positions they assume when the shutter blades are fully open.

Upon depression of the shutter releasing plunger 15 the lever 16 turns the lever 19 about its pivot 20 in a clockwise direction against the action of the spring 21, as shown in Fig. 3, and the end 24 of the lever 19 rides over the cam surface of the lug 33 on the member 27. Further depression of the plunger 15 causes the free end of the lever 16 to move past the lug 18 so that the lever 19 is turned rapidly in a counter-clockwise direction by the spring 21 and the member 27 is turned in a clockwise direction by the end 24 of the lever 19 engaging the lug 33, thereby causing the shutter blades 14 to open, as shown in Fig. 4. The shutter blades are closed by the counter-clockwise movement of the member 27 under the action of the spring 29 when the end 24 of the lever 19 moves clear of the lug 33 on the member 27.

The point at which the end 24 of the lever 19 moves clear of the lug 33 determines the length of the exposure, that is, the earlier the end 24 leaves the lug 33 during the counter-clockwise movement of the lever 19 the shorter the exposure because the shutter blades 14 are opened during the clockwise movement of the member 27 and closed during the counter-clockwise movement thereof. A shutter speed adjusting means comprises an annular plate 34 which is disposed beneath the mechanism plate 13 and is formed with a collar 35 which is rotatably mounted in the aperture in the mechanism plate 13. The rotatable plate 34 carries a cam surface 36 which, upon rotation of the plate 34, moves along an arcuate slot 37 in the mechanism plate 13.

Figure 5:
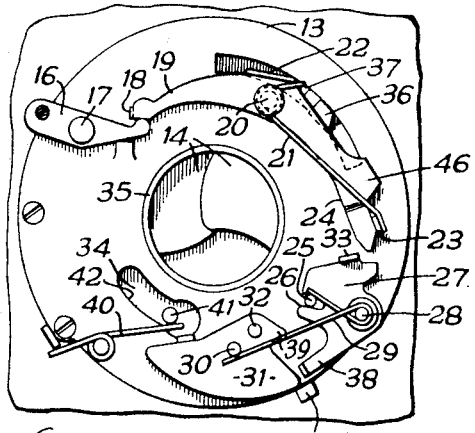
Fig. 5 is a view similar to Fig. 3 but with the shutter set for the longest exposure time.
Figure 6:
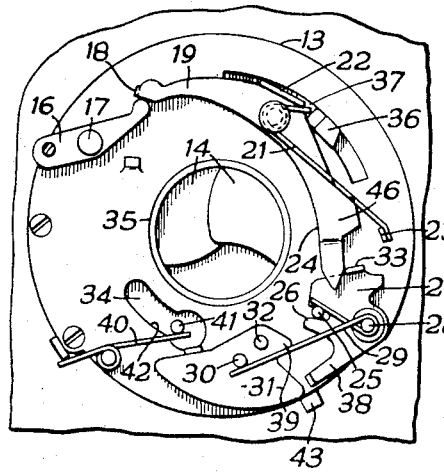
Fig. 6 is a view similar to Fig. 5 but with the shutter parts in the positions they assume just prior to opening the shutter blades.
Figure 7:
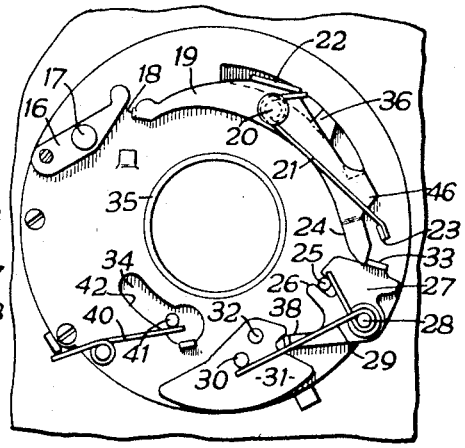
Fig. 7 is a view similar to Fig. 5 but showing the shutter parts in the position they assume when the shutter blades are fully open.
Figure 8:
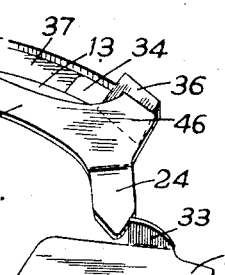
Fig. 8 is a perspective view, to an enlarged scale, of a part of the shutter operating mechanism.

In order to obtain the fastest shutter speed, the cam 36 is located beneath an extension 46 of the lever 19 as shown in Figs. 2–4 and 8, so that upon return movement of the lever 19 in a counter-clockwise direction under the action of the spring 21, the extension 46 rides up the cam 36, and at its summit, causes the end 24 of the lever 19 to flex over the top of the lug 33 on the member 27, thereby permitting the latter to turn in a counter-clockwise direction under the action of the spring 29 to close the shutter blades 14. When the cam 36 is moved clear of the path of movement of the lever 19, as shown in Figs. 5-7, the member 27 is moved by the end 24 of the lever 19 until the end 24 moves past the lug 33. During this additional rotation of the member 27 in a clockwise direction an arm 38 thereof engages a nose 39 on the weighted member 31 and moves the latter in a counter-clockwise direction against the action of the spring 29. Thus, the rate of movement of the shutter operating parts is slowed down and there is an increase in the period of time during which the shutter blades are held open.

In order to move the cam 36 to the position corresponding to the fastest shutter speed a spring 40 bears against a pin 41 on the rotatable plate 34 to move the latter in a clockwise direction, the pin 41 being movable along an arcuate slot 42 in the mechanism plate 13. The plate 34 is provided with a lug 43 which is bent forwardly and upwardly into the path of movement of a pin 44 carried by the diaphragm adjusting ring 9, the lug 43 and pin 44 being movable along an arcuate slot 45 in the front wall of the camera. As shown in Fig. 1, when the pin 44 is at the right hand end of the slot 45, the diaphragm is adjusted for the smallest aperture corresponding to numeral 1 on the light-value scale. During adjustment of the diaphragm ring 9 in a clockwise direction (as viewed in Fig. 1) from the numeral 1 position on the light value scale, the size of the diaphragm aperture is gradually increased until it reaches the maximum effective aperture at the numeral 10 position on the light value scale. Thus, for all adjustments of the diaphragm ring 9 corresponding to numerals 1–10 on the light value scale, the shutter is adjusted for the fastest shutter speed because the cam 36 is disposed beneath the extension 46 on the lever 19. Although movement of the diaphragm ring from a position corresponding to numeral 10 on the light value scale to the position numeral 11 on the light value scale increases the diaphragm opening it does not increase the maximum effective aperture of the diaphragm. However, this movement of the diaphragm ring 9 to the numeral 11 position on the light value scale does adjust the shutter to provide a slower shutter speed because the pin 44 on the diaphragm ring 9 moves the lug 43 on the rotatable plate 34 in a clockwise direction, as viewed in Fig. 1, thereby moving the cam 36 out of the path of movement of the extension 46 of the lever 19.

What we claim is:

1. In a camera, a photographic exposure control means, comprising, in combination, an adjustable diaphragm; means for adjusting said diaphragm; a multispeed shutter including a plurality of pivoted blades movable to open and close an exposure aperture in said camera; shutter blade actuating means including an oscillatable member connected to said blades so as to move the blades between their open and closed positions when said member is oscillated in opposite directions; a spring normally urging said oscillatable member in a blade-closing direction; a spring-loaded pivoted lever on said shutter arranged to engage and drive said oscillatable member in a blade-opening direction when moving from a cocked position and then slip out of engagement therewith a given time after the blades are opened to produce an exposure of one duration; means for moving said lever to a cocked position and releasing it therefrom to make an exposure; an adjustable cam member movable to and from an operative position wherein it is engaged by said lever during its blade-opening movement and after the blades have been opened and causes said lever to disengage said oscillatable member prior to the time it would slip out of engagement therewith and thereby produce an exposure of shorter duration; a spring normally urging said cam member to said operative position; and means controlled by said diaphragm adjusting means for automatically moving said cam member from its operative position after said diaphragm is opened to a predetermined value by adjustment thereof.

2. Photographic control means according to claim 1 in which said diaphragm adjusting means includes a pin movable through an arcuate path; means for adjusting said cam member including a lug movable through a portion of said arcuate path traveled by said pin and in the normal operative position of said cam member extending into the path of said pin to be picked up and moved by said pin as the diaphragm adjusting means is adjusted beyond a predetermined position, whereby the shutter is automatically adjusted to said longer exposure after the diaphragm is adjusted to a predetermined value.

References Cited in the file of this patent

UNITED STATES PATENTS 2,504,312     Fairbank              Apr. 18, 1950